United States Patent [19]

Horwitz et al.

[11] Patent Number: 5,281,631
[45] Date of Patent: Jan. 25, 1994

[54] PHOSPHONIC ACID BASED ION EXCHANGE RESINS

[75] Inventors: E. Philip Horwitz, Naperville, Ill.; Spiro D. Alexandratos, Knoxville, Tenn.; Ralph C. Gatrone, Naperville; Ronato Chiarizia, Oak Park, both of Ill.

[73] Assignee: Arch Development Corp., Chicago, Ill.

[21] Appl. No.: 811,098

[22] Filed: Dec. 20, 1991

[51] Int. Cl.$^5$ .................. C08F 230/02; B01J 39/12
[52] U.S. Cl. ..................... 521/38; 210/681; 210/688; 526/222; 526/278; 526/312; 526/336; 526/342; 526/347
[58] Field of Search .............. 526/278; 521/38, 33, 521/25

[56] References Cited

U.S. PATENT DOCUMENTS

| | | | |
|---|---|---|---|
| 3,062,792 | 6/1962 | McConnell | 526/278 |
| 3,297,663 | 1/1967 | Hofheim | 526/278 |
| 3,544,509 | 12/1970 | Carroll | 526/278 |
| 3,686,290 | 8/1992 | Carroll | 260/502.4 P |
| 3,928,192 | 12/1975 | Katzakian | 210/30 |
| 4,362,659 | 12/1982 | Macedo et al. | 252/629 |
| 4,376,706 | 3/1983 | Scott | 210/678 |
| 4,469,628 | 9/1984 | Simmons et al. | 252/629 |
| 4,585,845 | 4/1986 | Englehardt et al. | 526/240 |
| 4,758,635 | 7/1988 | Wilson et al. | 525/418 |
| 4,830,837 | 5/1989 | Justice | 423/181 |
| 4,895,905 | 1/1990 | Schneider et al. | 525/154 |
| 4,902,426 | 2/1990 | Macedo et al. | 210/656 |
| 4,939,284 | 7/1990 | Degenhardt | 558/142 |
| 5,091,491 | 2/1992 | Quach | 526/278 |

OTHER PUBLICATIONS

"Preparation and Adsorption Properties of the Polystyrene Resin Having Diethylenetriamine-N-N'-BIS (Methylene phosphonate) Group", Suzuki et al., Solvent Extr. and Ion Exch. 1. 105 (1989).

"Ion Exchange Selectivity Scales for Cations in Nitric Acid and Sulfuric Acid Media with a Sulfonated Polystyrene Resin", Strelow, et al., Anal. Chem. 37, 106 (1965).

"An Ion Exchange Selectivity Scale of Cations Based on Equilibrium Distribution Coefficients", Strelow, F., Anal. Chem. 1960 (circa).

"pH Dependent Decomposition of Beta Hydroxy-Substituted Organophosphorous Complexants", Gatrone, R., Amer. Chem. Soc. 54, 4272 (1989).

"The Synthesis and Decomposition of Novel Organophosphorous Complexants", Gatrone, et al., Sep. Sci. Tech. 25, 1607 (1990).

"Stability Constants for Europium (III) Complexes with Substituted Methane Diphosphonic Acids in Acids Solution", Nash et al., Inorganica Chemica Acta 169, 245 (1990).

*Primary Examiner*—Joseph L. Schofer
*Assistant Examiner*—Fred Zitomer
*Attorney, Agent, or Firm*—Marhsall, O'Toole, Gerstein, Murray & Borun

[57] ABSTRACT

An ion exchange resin for extracting metal ions from a liquid waste stream. An ion exchange resin is prepared by copolymerizing a vinylidene disphosphonic acid with styrene, acrylonitrile and divinylbenzene.

15 Claims, 5 Drawing Sheets

FROM FIG. 1A

FIG. 1B

HYDROLYSIS
CONTACT THE BEADS WITH 0.5-10 N (2N PREF.)
KOH IN DIOZANE: $H_2O$ (ANY RATIO, 1:7 PREF.)
↓
REFLUX 8h
↓
COOL
↓
WASH WITH WATER

↓

HYDROLYSIS (CONTD.)
CONTACT THE BEADS WITH AQUEOUS HCl
↓
REFLUX 8h
↓
WASH WITH WATER
↓
OVEN DRY (110°C/15h)

↓

SULFONATION
CONTACT DRY BEADS WITH CHLOROSULFONIC ACID
(OR OTHER SULFONATING AGENT) AS 0.1-25% SOLUTION
(10% PREF.) IN ETHYLENE CHLORIDE (OR OTHER SOLVENT)
↓
STIR AT 25° TO REFLUX (25°PREF.) TO COMPLETE
SULFONATION (1 h PREF.)
↓
DRY
↓
WASH WITH DIOXANE (OR OTHER SOLVENT)
↓
CONTACT WITH 0.1%-50% AQUEOUS SODIUM HYDROXIDE
(20% PREF.) FOR 17h
↓
WASH WITH $H_2O$-HCl-$H_2O$ CYCLE
↓
ANALYZE
↓
USE
(END OF SYNTHESIS)

PHOSPHONIC ACID BASED ION EXCHANGE RESINS

This invention was made with Government support under Contract No. W-31-109-ENG-38 awarded by the Department of Energy. The Government has certain rights in this invention.

BACKGROUND OF THE INVENTION

The present invention is directed generally to a strong metal complexing resin for ion exchange columns. More particularly, the invention is related to an ion exchange resin prepared by copolymerizing diphosphonic acid groups with acrylonitrile, styrene and/or divinylbenzene to form a polymeric resin for preferentially removing heavy metal contaminants in a highly acidic solution.

A variety of far reaching environmental protection statutes and regulations have significantly increased the need for effective and efficient means for removal of a wide spectrum of metal contaminants from aqueous based wastes or contaminated waterways. In addition, specific industries, such as the nuclear industry and electroplating industry, generate substantial quantities of water based effluent which are heavily contaminated with undesirable metal ions. The removal of metal ion contaminants from waste streams is often made difficult due to the strongly acidic nature of the waste effluent. Under such acidic conditions prior art metal complexing resins perform poorly to remove or recover such metals or have selectivity for only a very few types of metal ions. While phosphonic acids have been known to have the ability to complex with metal ions generally, there has been no demonstrated ability to allow selective removal of the chelated metal ions which is essential for selectivity of metal ion type as well as removal from the ion exchange resin.

It is therefore an object of the invention to provide an improved metal complexing resin for ion exchange columns.

It is also an object of the invention to provide a novel metal complexing resin and method of manufacture from copolymerization of diphosphonic acid groups with acrylonitrile, styrene and/or divinylbenzene.

It is an additional object of the invention to provide an improved method of preferentially removing toxic metal ions relative to alkaline and alkaline earth ions from strongly acidic water based wastes.

It is a further object of the invention to provide a novel product and method of manufacture of a sulfonated copolymer of diphosphonic acid group with acrylnitrile and styrene and/or divinylbenzene.

It is another object of the invention to provide an improved method of manufacturing a desired end product resin of narrow size distribution and uniform shape.

It is yet an additional object of the invention to provide a novel variety of copolymerization procedures involving copolymerizing vinylidene diphosphonic ester, a $R_2C=CR_2$ group where R is a combination of electron donating/electron withdrawing groups, a divinyl to trivinyl crosslinking agent and a porogen in combination with an initiator, such as benzoyl peroxide.

It is still a further object of the invention to provide an improved ion exchange resin and method for removing actinide metal ions in III, IV and VI oxidation states and transition and post transition metals from highly acidic and highly basic waste solutions.

These and other objects of the invention will be made clearer upon reference to the following Detailed Description and appended claims along with the drawings described as follows:

DETAILED DESCRIPTION OF PREFERRED EMBODIMENTS

Manufacture of Ion Exchange Resin

Preparation of the ion exchange resin necessitated polymerization of various monomers. Any conventional method of polymerization can be used, including bulk solution, suspension, emulsion and precipitation techniques.

Figure 1A:
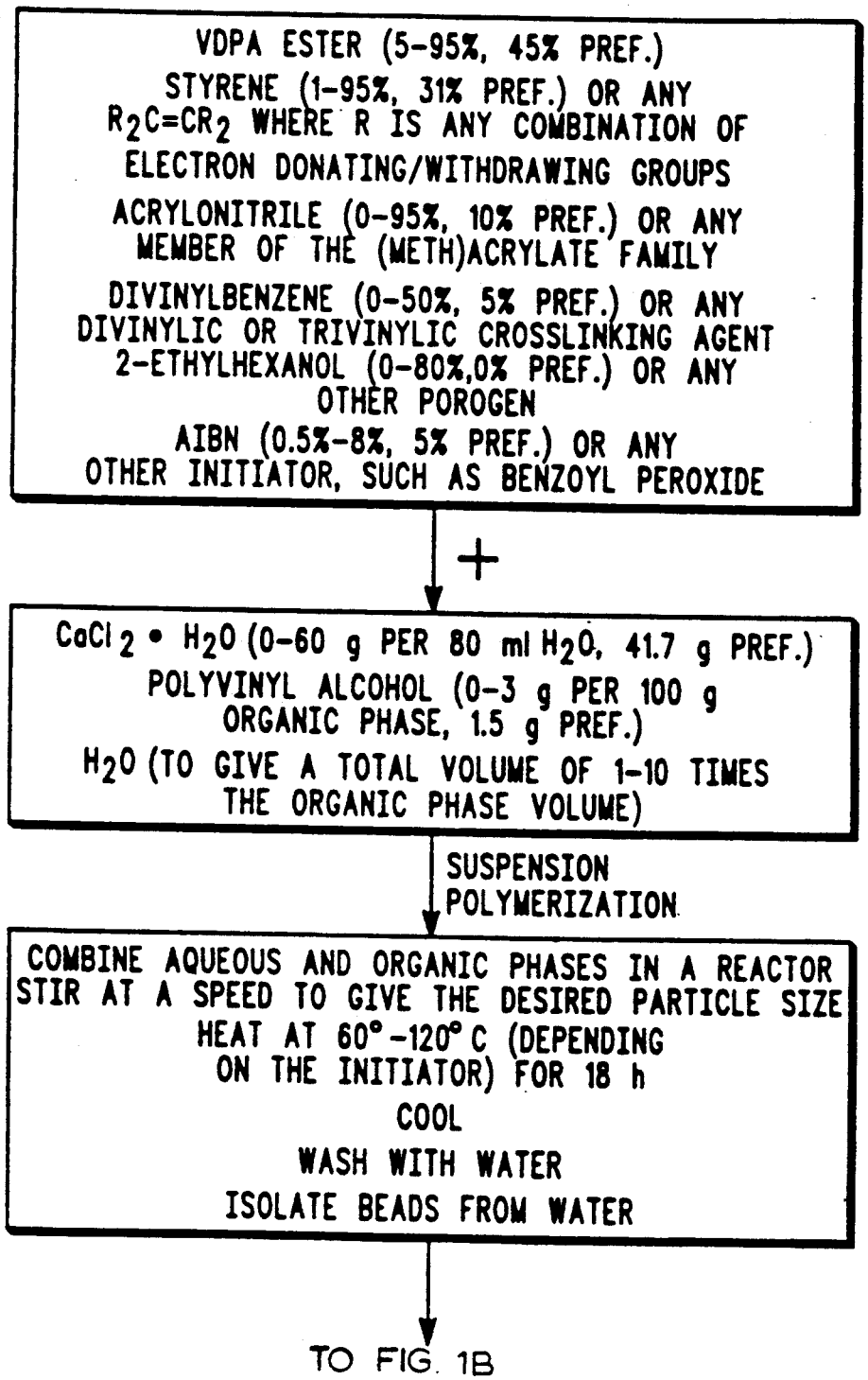
FIG. 1 illustrates the steps in a preferred procedure for the manufacture of Diphonix resin for ion exchange use.

The polymerization of diphosphonic acid groups to form an ion exchange resin was most preferably based on vinylidene diphosphonic acid ("VDPA", hereinafter) and its alkyl/aryl esters. VDPA polymerizes with acrylamide and the esters polyermize with styrene or other $R_2C=CR_2$ monomer where R is a combination of electron donating/withdrawing groups. As illustrated in the flow chart of FIG. 1, a variety of additional copolymerization entities can also be used including: (1) acrylonitrile or other member of the (meth)acrylate family, (2) divinylbenzene or other divinylic or trivinylic crosslinking agent, (3) 2-ethylhexanol or other porogen and (4) an initiator such as benzoyl peroxide or AIBN, azobis(isobutyro) nitrile ("AIBN"). Appropriate and most preferred ranges of weight percent of each component are also shown in FIG. 1 ("parts" of various components hereinafter refers to relative weight units allowing calculation of weight percent). Examples of specific conditions of such copolymerization steps are set forth in the Examples at the end of the Detailed Description. The polymerization can be commenced by use of an initiator, such as $K_2S_2O_8$, or the ones listed in FIG. 1 or even ionic initiators, such as a strong base like $NaNH_2$.

The end product Diphonix resin can be made either microporous or macroporous by the addition of diluents, such as porogens, to the monomer solution. Typical diluents can include, for example, hydrocarbons (such as toluene) and alcohols (such as 2-ethylhexanol, 4-methyl-2 pentanol and octanol) to achieve a target porosity and surface area.

The manufacture of ionic exchange resin beads can be implemented by including another step of preparing an aqueous phase of $CaCl_1.2H_2O$, polyvinyl alcohol and water. A range of Preferred relative weights and the most preferred weight of each component are shown in FIG. 1. This aqueous phase is combined with the organic copolymerizable mixture. The combined mixture is charged to a conventional reactor equipped with a thermometer, condenser and overhead stirrer. The mixture is heated to 60°-120° C. (primarily depending on the type of initiator used) for eighteen hours and then stirred to give the desired resin particle size, such as 100-300 microns diameter spheres. The mixture and resin particles are then cooled to ambient, the resin particles water washed and then isolated in a water free environment.

Polymerization of VDPA itself leads directly to a resin with ion exchange properties. If a VDPA tetraester is polymerized, a hydrolysis step is usually needed for regeneration of the ion exchange sites of the VDPA. For example, hydrolysis can be implemented by treating the resin beads with 0.5-10N (2N preferably) KOH in a dioxane: water mixture of ratio preferably 1:7. The resin/hydrolysis mixture is refluxed for 18 hours, the resin is washed with water and oven dried at 110° C. for 15 hours.

In another preferred form of the invention, an additional processing step further enhances the kinetics of complexation of metal ions by the Diphonix species. If the resin to be complexed is in an aqueous or similar solution, this step involves increasing the polymer's hydrophilicity, the moisture holding capacity. This can be accomplished by preparing the Diphonix resin with highly polar monomers, such as acrylic acid and benzenesulfonic acid or post functionalizing it with carboxylic acid and sulfonic acid, for example.

In a most preferred embodiment, Diphonix resin beads are contacted with chlorosulfonic acid (or other sulfonating agent) as a 0.1-25% solution (10% most preferred) in ethylene chloride or other solvent. The mixture is stirred at 25° C. and refluxed until sulfonation is complete (about 1 hour). The resin beads are then dried, washed with dioxane or other solvent, contacted with 0.1-50% aqueous NaOH (preferably 20%) for 17 hours and washed with a cycle of water/HCl/water.

Such additional functionalizations create a multifunctional resin in that the diphosphonic acid groups are accompanied by sulfonic acid and/or carboxylic acid groups. Such multifunctional sites allow use of each group for complexing particular metal ions to which the group is sensitive. Such a multifunctional capability should have substantial commercial advantages.

Distribution Ratio Determination

The Diphonix resin is obtained in the hydrogen ion form using the procedures described hereinbefore. In some studies with transition and post-transition metal ions, the $Ca^{2+}$ ion form of Diphonix is employed. The Ca form of Diphonix, as well as the Ca forms of monophosphonic and AG MP-50 resins, (commercially available from Bio Rad Corp., CA) were prepared by eluting an ion exchange column packed with ion-exchange resins in the $H^+$ form with excess calcium hydroxide solution followed by several displacement volumes of 2M $Ca(NO_3)_2$ at pH=9 [pH adjusted with $Ca(OH)_2$] and finally by rinsing with ten bed volumes of water to remove the excess Ca salts.

The sorption of a number of radioisotopes and stable elements from various solutions by the resin was measured by contacting a known volume (typically 1.0 mL) of a spiked solution of approPriate concentration with a known weight of resin. Resins were either the $H^+$ form or the $Ca^{2+}$ form. The ratio of the aqueous phase volume (mL) to the weight of the resin (g) ranged from 20 to 200. This ratio is determined primarily by the need to produce an easily measured decrease in the aqueous activity of concentration by contact with the resin. Although equilibrium is generally reached in under 15-30 minutes, a 2 hour mixing time was normally employed. In the case of Cr(III), 48 hours mixing time was employed.

The mixing of the solid and liquid phases was performed small magnetic bars rotated at such a speed (about 200 rpm) that the resin was suspended in the aqueous phase. After equilibration, the phases were centrifuged and the aqueous phase withdrawn from the test tube. To ensure that the aqueous phase did not contain any dispersed resin, it was also filtered through Whatman #1 paper after centrifugation.

Weight distribution ratios were calculated from the following equation:

$$D = \frac{A_o - A_s}{W} / \frac{A_s}{V}$$

where $A_o$ and $A_s$ are the aqueous phase radioactivities (counts per minute) or concentrations (measured spectroscopically) before and after equilibration, respectively; W is the weight of resin (g) and V is the aqueous phase volume (mL). The weight of resin (g) used in the calculation of D may be expressed on a dry weight basis (i.e., resin dried in an oven at 100° C.) or a wet weight basis (i.e., resin filtered and air dried). The D measured for air dried resin (referred to as a wet-weight) was converted to the corresponding D for oven dried resin (referred to as a dry-weight) by dividing 0.372. The factor 0.372 corrects for the loss of absorbed water from the resin on oven drying. When the sorption of various elements was measured using the Ca form of the resin, the correction factor was 0.575.

Sorption from Acidic Media-Comparison with Prior Art

Figure 2A:
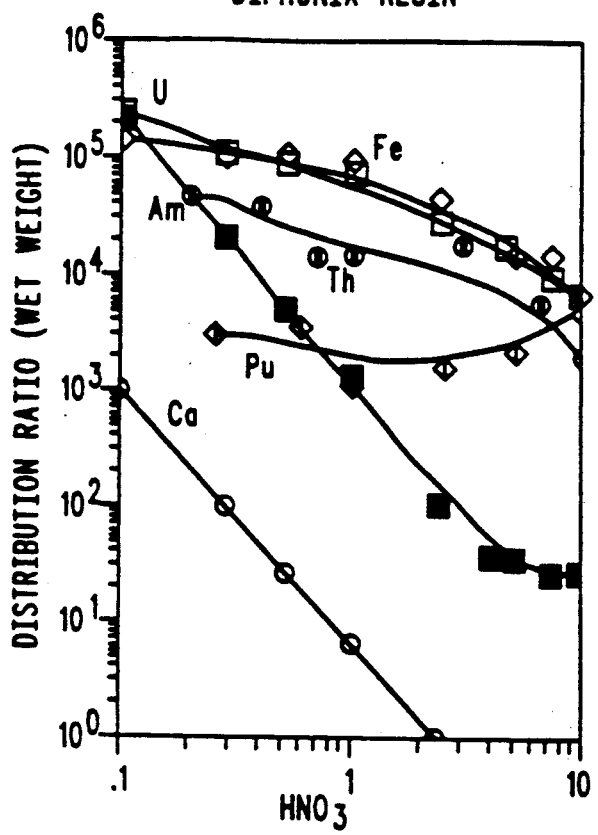
FIG. 2A shows the distribution ratio for Diphonix resin over the $HNO_3$ molarity for a variety of metal ions and FIG. 2B shows a comparison set of plots for a commercial AGMP-50 resin.
Figure 2B:
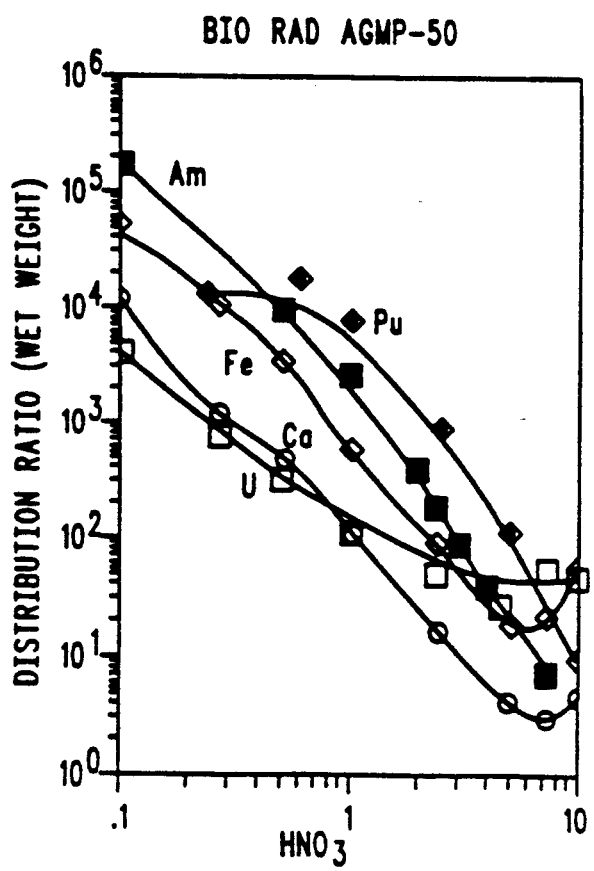
Figure 3:
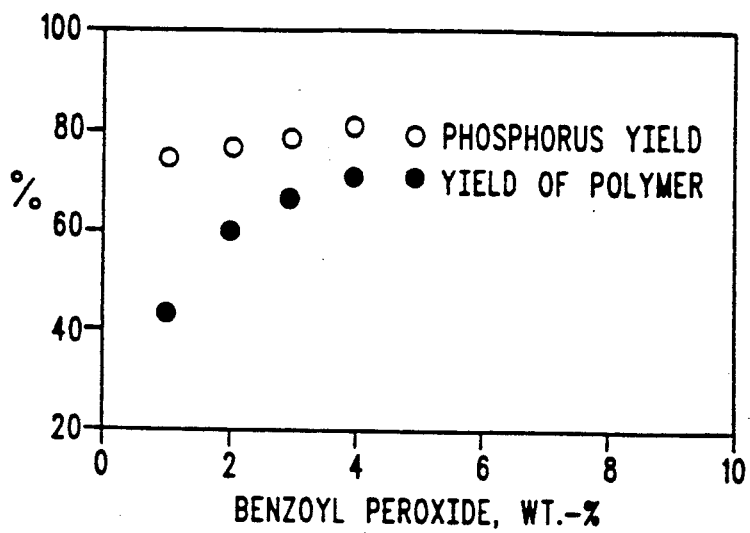
FIG. 3 illustrates the effect of initiator level on the Percentage $Et_4VDPA$ incorporation and percent polymer yield.

FIG. 2 shows a comparison of ion-exchange sorption of Th(IV), U(VI), Pu(IV), Am(III), Fe(III), and Ca(II) (as measured by the distribution ratio) by a commercially available strong acid sulfonate resin Bio-Rad AG MP-50 and Diphonix. All resins were initially in the $H^+$ form. Bio-Rad AG MP-50 is a macroporous Dowex-50 resin. Strong acid sulfonate cation exchange resins are the most widely used cation exchange resins. The Diphonix resin employed was prepared by the procedure described herein. The data in FIG. 2 show that Diphonix retains Th, U, Pu and Fe much more strongly above 1M $HNO_3$ than the AG MP-50 resin (See Table 1). The difference between Diphonix and AG MP-50 regarding the retention of Am is less pronounced than is the case with Th, U, Pu, and Fe; but Diphonix is still significantly superior to the AG MP-50 resin. Calcium, on the other hand, is more poorly retained by Diphonix than by AG MP-50. However, this property of Diphonix is an advantage because generally one does not wish to retain Ca. Calcium's lower retention by Diphonix indicates that the Ca in, for example, actinide bearing waste solutions would cause less interference than would be the case for AG MP-50.

The superiority of Diphonix in the rention of Th, U, Pu, Am, and Fe and in the rejection of Ca at high $HNO_3$ concentration is shown clearly in Tables 2 and 3. Table 2 compares the dry weight distribution ratios in 5M $HNO_3$ and Table 3 compares the dry weight distribution ratios in 10M $HNO_3$. Two different cation exchange resins were compared with Diphonix, namely, a monophosphonic acid resin, which is substantially similar to resin commercially available under the trade name Chelite ®P, and Bio Rad AG MP-50. Dry-weight distribution ratios were used for the comparison because of the variation of water contents of the three air-dried resins.

TABLE 1

Comparison of the Physical Properties of Diphonix and Bio-Rad AG MP-50.

| | Diphonix | AG MP-50 |
|---|---|---|
| True density of resin in water | 1.155 | 1.082 |
| Density of air-dried resin (Shipping density) | 0.689 | 0.630 |
| Bed density (g of air-dried resin/ml of bed) | 0.722 | 0.885 |
| Bed density (g of oven-dried resin/ml of bed) | 0.304 | 0.419 |
| Capacity (mmol of diphosphonate groups/g of oven-dried resin) | 0.90 | — |

The data in Tables 2 and 3 show clearly the superiority of DiPhonix resin over the monophosphonic and sulfonic resins in the ability to remove U, Pu, Am, and Fe from strong nitric acid.

Table 4 shows a comparison between Diphonix and the monophosphonic acid and sulfonic resin for U, Pu, and Am for 4M $NaNO_3$-0.1M $HNO_3$. Again the ion-exchanger sorption of U, Pu, and Am on the Diphonix resin is at least ten to one hundred times higher than on the other two resins. The data in Tables 2, 3 and 4 are highly significant because of the large prevailing number of highly acidic and highly salted actinide bearing waste solutions.

Th, U, Pu, Am and Fe may be efficiently desorbed by contacting the resin (or eluting a column containing the resin) with 0.5 to 1.0M 1-hydroxyethane-1,1-diphosphonic acid (Abbrev. HEDPA) solution. The distribution ratios for TH, U, Pu, Am and Fe are <1 in the presence of 1 M HEDPA.

TABLE 2

Comparison of the Sorption of Actinides, Iron and Calcium by Sulfonic, Monophosphonic, and Diphosphonic Acid Ion Exchange Resins

| | 5M $HNO_3$ Weight Distribution Ratio (Dry-Weight) | | |
|---|---|---|---|
| | Sulfonic | Monophosphonic | Diphosphonic |
| Th | — | — | $2.0 \times 10^4$ |
| U | $5.7 \times 10^1$ | $2.6 \times 10^2$ | $5.1 \times 10^4$ |
| Pu | $1.3 \times 10^2$ | — | $6.5 \times 10^3$ |
| Am | $4.2 \times 10^1$ | 2.0 | $9.9 \times 10^1$ |
| Fe | $4.0 \times 10^1$ | $3.0 \times 10^2$ | $4.6 \times 10^4$ |
| Ca | 9.1 | 1.5 | $6.5 \times 10^{-1}$ |

TABLE 3

Comparison of the Sorption of Actinides, Iron and Calcium by Sulfonic, Monophosphonic, and Diphosphonic Acid Ion Exchange Resins

| | 10M $HNO_3$ Weight Distribution Ratio (Dry-Weight) | | |
|---|---|---|---|
| | Sulfonic | Monophosphonic | Diphosphonic |
| Th | — | — | $5.6 \times 10^3$ |
| U | $4.6 \times 10^1$ | $1.5 \times 10^2$ | $2.0 \times 10^4$ |
| Pu | $1.9 \times 10^1$ | $9.4 \times 10^2$ | $1.6 \times 10^4$ |
| Am | $1.6 \times 10^1$ | 4.2 | $7.5 \times 10^1$ |
| Fe | $1.2 \times 10^2$ | $1.1 \times 10^3$ | $1.7 \times 10^4$ |
| Ca | 9.7 | 5.6 | 1.4 |

TABLE 4

Comparison of the Sorption of U, Pu and Am by Sulfonic, Monophosphonic, and Diphosphonic Acid Ion Exchange Resins

| | 4M $NaNO_3$-0.1M $HNO_3$ Weight Distribution Ratio (Dry-Weight) | | |
|---|---|---|---|
| | Sulfonic | Monophosphonic | Diphosphonic |
| U | $2.9 \times 10^2$ | $2.9 \times 10^3$ | $2.2 \times 10^4$ |
| Pu | $2.6 \times 10^2$ | $1.3 \times 10^3$ | $2.9 \times 10^3$ |
| Am | $4.8 \times 10^1$ | $2.4 \times 10^1$ | $5.7 \times 10^3$ |

Sorption from pH 5, 6, 7 and 8

Tables 5 and 6 compare the oven dry-weight distribution ratios at PH 5, 6, 7, and 8 for a number of transition and post-transition elements using the Ca form of Diphonix and of AG MP-50. The Ca form of the two resins was used for ion-exchange sorption measurements to compare the ability of the two resins to selectively remove the various metal ions studied with $Ca^{2+}$ as the counter ion in the resin phase. High selectivity of a given metal ion, e.g. $Pb^{2+}$, over $Ca^{2+}$ and $Mg^{2+}$ is essential in applications dealing with the removal of hazardous metal ions from, e.g., hard water, waste streams, and contaminated groundwater. The retention of $Ca^{2+}$ and $Mg^{2+}$ by Diphonix is essentially the same, therefore it is not necessary to measure distribution ratios using both the Ca form and the Mg form of the diphosphonic resin. Therefore, to demonstrate the effectiveness of the Diphonix resin, the $Ca^{2+}$ form of the resin was used. The buffer employed to adjust the pH was 0.1M ammonium hydroxide/ammonium acetate/acetic acid solutions. Ammonium ion has a retention very similar to sodium and potassium ions on cation exchange resins, therefore $NH^{4+}$ does not affect the D measurements.

The data in Tables 5 and 6 show that ion-exchange sorption of the Diphonix resin is significantly stronger for every metal ion studied except for Hg and Sn. Even in the case of Hg and Sn, the diphosphonic resin shows strong sorption. The elements listed in Tables 5 and 6 may be desorbed from Diphonix using a 0.5 to 1.0M HEDPA solution or in the case of Cr(III), Mn(II), Co(II), Ni(II), Cu(II), Zn(II) Cd(II), Hg(II), Sn(II), and Pb(II) with 2M $H_2SO_4$.

Diphonix is also superior to other commercially available chelating ion-exchange resins. For example, Chelite C, a stryrene-DVB matrix with iminodiacetic acid groups, does not show selectivity for Mn over Ca and metal ions such as Co(II), Ni(II), Zn(II), and Cd(II) are not retained at pH<4. The distribution ratios for these latter four elements are so high at pH 2 to 5 on the $Na^+$—$H^+$ form of Diphonix that no radiotracer can be detected in the aqueous phase. Chelite N, a cross-linked macroporous polymer with amidoxime groups, will not retain actinides (Th, U, Pu and Am) from acidic media (pH <2) nor retain transition metals like Co, Ni, Zn, and Cd at pHs <4. Chelite P, a styrene-DVB matrix with aminomethylphosphonic acid groups, is not selective for Mn, Ni, Co, Cd over Ca nor will it retain actinides, e.g. Am(III) from highly acidic and salt media (see Tables 2, 3 and 4).

TABLE 5

Comparison of Distribution Ratios (Dry-Weight) for the Calcium Form of (Bio Rad AGMP 50)* and a Diphosphonic Acid Resin

| | | | 0.1M Buffer | | | |
|---|---|---|---|---|---|---|
| pH | U | Cr | Mn | Co | Ni | Al |
| 5 | $1.3 \times 10^4$ | $5.0 \times 10^4$ | $4.1 \times 10^3$ | $4.5 \times 10^2$ | $2.7 \times 10^2$ | $3.2 \times 10^2$ |
| | $(1.5 \times 10^2)$ | $(8.7 \times 10^1)$ | $(1.0 \times 10^2)$ | $(4.2 \times 10^1)$ | $(5.8 \times 10^1)$ | $(7.7 \times 10^1)$ |
| 6 | $1.6 \times 10^4$ | $1.8 \times 10^4$ | $2.3 \times 10^3$ | $4.8 \times 10^3$ | $2.1 \times 10^3$ | $3.5 \times 10^2$ |
| | $(2.8 \times 10^2)$ | $(2.1 \times 10^2)$ | $(6.6 \times 10^1)$ | $(3.9 \times 10^1)$ | $(3.8 \times 10^1)$ | $(3.2 \times 10^2)$ |
| 7 | $7.8 \times 10^3$ | $6.9 \times 10^3$ | $4.9 \times 10^3$ | $1.7 \times 10^4$ | $6.7 \times 10^3$ | $3.2 \times 10^2$ |
| | $(9.5 \times 10^1)$ | $(1.0 \times 10^3)$ | $(1.2 \times 10^2)$ | $(8.4 \times 10^1)$ | $(8.2 \times 10^1)$ | $(4.1 \times 10^2)$ |
| 8 | $5.8 \times 10^3$ | $6.1 \times 10^3$ | $4.9 \times 10^3$ | $2.0 \times 10^4$ | $9.3 \times 10^3$ | $4.3 \times 10^2$ |
| | $(2.0 \times 10^1)$ | $(1.1 \times 10^3)$ | $(1.4 \times 10^2)$ | $(1.8 \times 10^2)$ | $(1.4 \times 10^2)$ | $(5.1 \times 10^2)$ |

*(Sulfonic acid resin data is in parentheses)

TABLE 6

Comparison of Distribution Ratios (Dry-Weight) for the Calcium Form of (Bio Rad AGMP 50)* and a Diphosphonic Acid Resin

| | | | 0.1M Buffer | | | |
|---|---|---|---|---|---|---|
| pH | Cu | Zn | Cd | Hg | Sn | Pb |
| 5 | $-10^3$ | $1.4 \times 10^4$ | $1.2 \times 10^3$ | $3.5 \times 10^3$ | $2.3 \times 10^3$ | $5.7 \times 10^3$ |
| | $(9)$ | $(5.6 \times 10^1)$ | $(5.3 \times 10^1)$ | $(3.4 \times 10^3)$ | $(7.8 \times 10^2)$ | $(5.6 \times 10^1)$ |
| 6 | $-10^3$ | $1.3 \times 10^5$ | $1.1 \times 10^4$ | $3.9 \times 10^3$ | $2.3 \times 10^3$ | $5.0 \times 10^3$ |
| | $(1 \times 10^1)$ | $(5.5 \times 10^1)$ | $(4.7 \times 10^1)$ | $(2.5 \times 10^3)$ | $(2.7 \times 10^3)$ | $(4.9 \times 10^1)$ |
| 7 | $10^3$ | $1.0 \times 10^5$ | $3.3 \times 10^4$ | $5.4 \times 10^3$ | $4.9 \times 10^3$ | $2.7 \times 10^4$ |
| | $(5 \times 10^1)$ | $(1.5 \times 10^2)$ | $(1.2 \times 10^2)$ | $(2.2 \times 10^3)$ | $(2.5 \times 10^3)$ | $(9.5 \times 10^1)$ |
| 8 | $10^3$ | $9.8 \times 10^4$ | $4.0 \times 10^4$ | $3.5 \times 10^3$ | $1.4 \times 10^4$ | $1.3 \times 10^4$ |
| | $(2 \times 10^3)$ | $(4.2 \times 10^2)$ | $(2.4 \times 10^2)$ | $(4.4 \times 10^3)$ | $(2.8 \times 10^3)$ | $(1.5 \times 10^2)$ |

*(Sulfonic acid resin data is in parentheses)

As a consequence of these substantially improved metal complexity capabilities, Diphonix can strongly retain actinides from highly acidic and highly salted solutions and strongly retain a large number of transition and post-transition metals in the presence of alkali metal (Na, K) and alkaline earth metal (Mg, Ca) salts at pH's >2. These properties indicate a number of applications, including without limitation:
1. Removal of actinides in the (III), (IV), and (VI) oxidation states from highly acidic and/or highly salted aqueous waste solutions.
2. Removal of U(VI) and a wide variety of hazardous metal ions (V, Cr, Mn, Co, Ni, Zn, Cd, Hg, Pb) from groundwater and industrial waste waters.
3. Removal of traces of toxic metal such as V, Cr, Mn, Co. Ni, Cu, Zn, Cd, Hg, and Pb from drinking water to ensure potability.
4. Removal of Mn, Co and Ni from oil refinery process waters generated in washing catalysts used for desulfurization operations.
5. Removal of Cr from pickling liquors.
6. Removal of Fe(III) from chelating agents used in boiler descaling operations.
7. Removal of radioisotopes from rad wastes generated in nuclear power plants.
8. Separation of fructose from glucose.

The following non-limiting examples set forth a variety of methods, products and apparatus used in demonstrating the invention set forth in the appended claims.

EXAMPLE 1

An organic phase consisting of 13.5 parts tetraalkyl(aryl) VDPA ester (which may or may not be oligomerized), 9.30 parts styrene, 3.00 parts acrylonitrile, 2.70 parts divinylbenzene (technical grade). and 1.5 parts azobis (isobutyro) nitrile is charged to a reactor equipped with thermometer, condenser, and overhead stirrer. If it is desired to produce beads, then the reactor also contains an aqueous phase consisting of 41.7 parts $CaCl_2 \cdot H_2O$ in 80 parts aqueous solution also containing 1.5% polyvinyl alcohol (based on the weight of organic Phase). The suspension is stirred at 223 rpm for 18 h at 75° C.

The resulting beads, after washing with water, can be hydrolyzed directly to regenerate the ion exchange sites inherent to VDPA. Alternatively, they can be washed by Soxhlet extraction and used as ionic or molecular coordinating agents.

After hydrolysis, the beads can be used as ion exchange resins. Additionally, the phenyl rings in the polymer (when styrene is used as comonomer) can be sulfonated with any sulfonating agent (e.g., sulfuric acid, chlorosulfonic acid, etc.) to produce a polymer with an enhanced microporosity brought about by its increased hydrophilicity. For example, chlorosulfonation requires only 1 h at room temperature for complete reaction of the phenyl rings; subsequent hydrolysis with sodium hydroxide is then required in order to convert the sulfuryl chloride sites into sulfonic acid groups. By doing so, the solids level of the resin drops from approximately 0.60 g dry resin per g wet resin to 0.30 g dry resin per g wet resin. The final phosphorus capacity of the polymer is 1.8 mequiv/g dry resin.

EXAMPLE 2

Bulk polymerization was carried out in a reaction vessel in a conventional, well-known manner by combining tetraalkyl(aryl) VDPA with 0 to 80 wt % divinylbenzene (DVB) and can be carried out with 4 wt % benzoyl peroxide as an initiator and performed at 80° C. over 18 h. Resin made with 10% DVB has a phosphorus capacity of 4.03 mequiv/g, while resin made with 15% DVB has a capacity of 3.81 mequiv/g, and resin made with 20% DVB has a capacity of 3.54 mequiv/g

EXAMPLE 3

Bulk Polymerization and suspension polymerization (using the aqueous phase as above) were carried out with an organic phase consisting of 45 parts tetraalkyl-(aryl) VDPA, 23 parts butyl acrylate, 10 parts vinyl propionate, 10 parts technical grade DVB, and 2 parts azobis(isobutyro)nitrile. An additional 25% (based on total monomer weight) of 2-ethylhexyl alcohol was added as porogen. After polymerization, the porogen is washed free of the polymer with methanol; steam distillation is an alternate method of purification. The polymer has a phosphorus capacity of 2.22 mequiv/g before hydrolysis and 2.95 mequiv/g after hydrolysis with HCl.

EXAMPLE 4

The reactivity of vinyl phosphonic acid (VPA) and its esters is the same as found for VDPA and its esters. In a typical example, 5.11 parts dialkyl VPA, 1.11 parts acrylonitrile, 3.44 parts styrene, 1.09 parts technical grade DVB, and 0.44 parts azobis(isobutyro)nitrile was bulk polymerized at 80° C. for 18 h. The resin has a phosphorus capacity of 1.43 mequiv/g before hydrolysis and 0.94 mequiv/g after sulfonation.

EXAMPLE 5

A copolymerized VDPA was prepared as described in FIG. 1 using the following components: 45% tetraethyl VDPA, 29% styrene, 10% acrylonitrile, 5% divinylbenzene, 3% trimethylolpropane trimethacrylate, 5% benzoyl peroxide. A suspension polymerization was carried out as explained in FIG. 1 with no hydrolysis or sulfonation steps taken. The yield was 65% for polymer and 64.8% of VDPA into the polymer.

EXAMPLE 6

The effect of acrylonitrile on the gel point, polymer yield and VDPA incorporation was determined in a bulk polymerization of monomers.

A first specimen A consisted of 450 mg tetraethyl ester of VDPA, 250 mg of butylacrylate and 250 mg styrene. The gel point was 300 minutes, 44% yield of polymer and 81% of the VDPA was incorporated.

Specimen B consisted of 450 mg tetraethyl ester of VDPA, 100 mg of acrylonitrite and 310 mg of styrene. The gel point was 80 minutes, the polymer yield was 68% and 86% of the VDPA was incorporated.

Specimen C consisted of 300 mg tetramethyl ester of BDPA, 250 mg acrylonitrile and 300 mg styrene. The gel point was 21 minutes, a 71% polymer yield and 65% of the VDPA was incorporated.

All of the three specimens also included 5% divinylbenzene and 5% benzoyl peroxide.

EXAMPLE 7

Polymerization of tetraethyl ester VDPA was carried out using only divinylbenzene as a crosslinking monomer. The full composition of components was 50% tetraethyl ester VDPA, 25% divinylbenzene, 20% ethylvinylbenzene, 5% benzoyl peroxide and 25% ethylhexanol (weight percentages). The preparation was a bulk polymerization performed by the Procedure of Example 2. The polymer yield was 54.2%, 85.3% of the VDPA was incorporated into the polymer, and the resulting resin complexed 26.7% of the Eu (III) from a 0.04N $HNO_3$ solution.

EXAMPLE 8

Another variation on the above method and product of Example 7 started with a different component percentage of 41% tetraethyl ester VDPA, 30% divinylbenzene, 24% ethylonyl benzene, 5% benzoyl peroxide and 25% 2 - ethylhexanol. The bulk yield was 70.4% polymer, 91.6% of the VDPA was incorporated and 26.4% Eu (III) was complexed from a 0.04N $HNO_3$ solution.

EXAMPLE 9

A set of different bulk polymer were prepared with substantial changes in percentage of components only for the initiator such as benzoyl peroxide. Following the basic procedure for bulk polymerization of Example 2, tetraethyl ester specimen had weights of 0.45 g, butylacrylate of 0.32–0.36 g, divinylbenzene of 0.18 g and benzoyl peroxide varying from 0.05 g to 0.01 g over 5 specimens, it was determined that the Percentage yields were as follows:

| Benzoyl peroxide | .05 g | .04 g | .03 g | .02 g | .01 g |
| --- | --- | --- | --- | --- | --- |
| % yield (polymer) | 77.2 | 72.1 | 67.0 | 61.0 | 43.7 |
| % VDPA incorp. | 80.1 | 81.3 | 79.1 | 77.1 | 75.2 |

EXAMPLE 10

This example demonstrates the usefulness of vinyl acetate for increasing VDPA incorporation. A sample of 0.45 g tetraethyl ester VDPA, 0.26 g vinyl acetate and 0.25 g diethylene glycoldiacrylate (acting as a crosslinking agent) and 0.04 g benzoyl peroxide and 0.50 g 2-ethylhexanol were bulk polymerized resulting in a 66.98% polymer yield and 100% VDPA incorporation. The basic polymerization conditions of Example 2 were followed.

EXAMPLE 11

This example describes the polymerization of a diethyl ester of vinyl (mono) phosphoric acid (VPA). These polymerizations were carried out in the same manner as in Example 2. The various proportional components and results are as follows:

| Specimen | A (g.) | B (g.) | C (g.) | D (g.) |
| --- | --- | --- | --- | --- |
| VPA | 0.50 | 0.50 | 0.50 | 0.50 |
| butyl acrylate | 0.28 | 0.18 | 0.10 | 0 |
| vinyl propionate | 0 | 0.10 | 0.18 | 0.28 |
| divinyl benzene | 0.18 | 0.18 | 0.18 | 0.18 |
| AIBN | 0.04 | 0.04 | 0.04 | 0.04 |
| 2-ethylhexanol | 0.25 | 0.25 | 0.25 | 0.25 |
| % yield | 52.2 | 48.1 | 44.4 | 41.5 |
| % incorporation VDPA | 52.4 | 67.8 | 80.3 | 95.0 |

EXAMPLE 12

This example concerned the copolymerization of VDPA with N, N'-methylene-bis-acrylamide and acrylamide. It was found that equal amounts of VDPA and bis-acrylamide would polymerize in solutions with potassium persulfate as the initiator to give polymers with phosphorus capacities as high as 1.76 mequiv/g (37% incorporated of VDPA). These polymers were white powders which exhibited large swelling ratios in water. In all cases, the acid capacities were found to be twice the phosphorus capacities. A solid-state $^{31}P$ nmr study of one such polymer showed a resonance at 27.5 ppm due to the phosphonic acid sites and a narrow unidentified signal at −2.2 ppm. An attempt to prepare a homopolymer under the same conditions was not successful. All of the VDPA/bis-acrylamide polymers displayed a high affinity for trace levels of Fe(III) at equilibrium.

EXAMPLE 13

Figure 4:
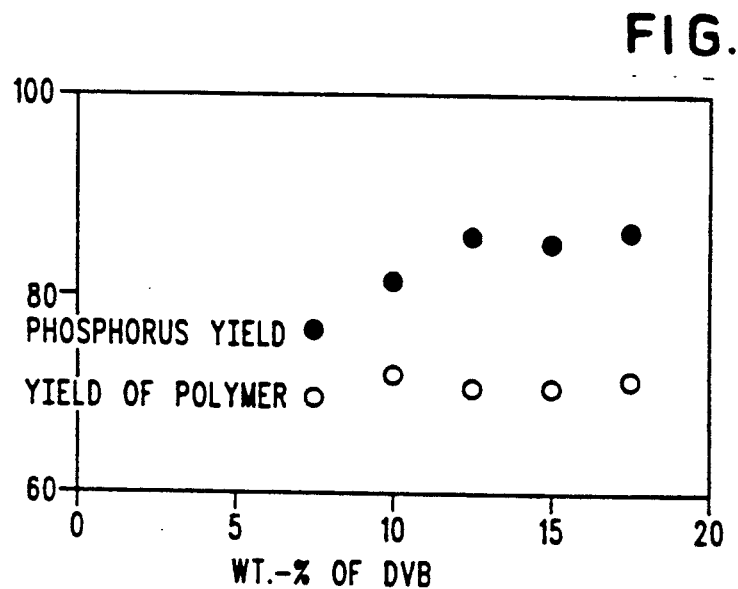
FIG. 4 shows the effect of percent DVB on the percentage of $Et_4VDPA$ incorporation and the percent of polymer yield.

Specimens were processed in accordance with Example 9, but the divinylbenzene level was varied. (Bulk polymer at 100° C./18 h.) This data is also illustrated in FIG. 4.

|  | A | B | C | D | E |
|---|---|---|---|---|---|
| Resin | 139A | 129B | 139B | 139C | 139D |
| Et4VDPA | 0.45 g | 0.45 g | 0.45 g | 0.45 g | 0.45 g |
| butylacrylate | 0.375 g | 0.32 | 0.285 | 0.240 | 0.195 |
| DVB(tech.) | 0.135 g | 0.18 | 0.225 | 0.270 | 0.315 |
| [% DVB, puve] | 7.5% | 10.0% | 12.5% | 15.0% | 17.5% |
| BPO | 0.04 g | 0.05 | 0.04 | 0.04 | 0.04 |
| % yield | 69.8 | 72.2 | 70.7 | 70.05 | 71.7 |
| % incorporn | 76.6 | 80.1 | 85.8 | 85.1 | 86.3 |

EXAMPLE 14

Specimens were processed in accordance with Example 9, but the amounts of Et4VDPA in the copolymer were changed. The effect on the yield was determined, and the % incorp. remained almost unchanged. (10% DVB, bulk polym'n 100° C./18 h.) The data

|  | A | B | C | D |
|---|---|---|---|---|
| Resin | 139A | 129B | 139B | 139C |
| Et4VDPA | 0.77 g | 0.64 g | 0.57 | 0.45 |
| buylacrylate | 0 | 0.13 | 0.20 | 0.32 |
| DVB(tech.) | 0.18 g | 0.18 | 0.18 | 0.18 |
| BPO | 0.05 | 0.05 | 0.05 | 0.05 |
| % yield | 40.9 | 52.4 | 60.2 | 72.2 |
| % incorporn | 75.8 | 76.9 | 77.3 | 80.1 |

EXAMPLE 15

Figure 6:
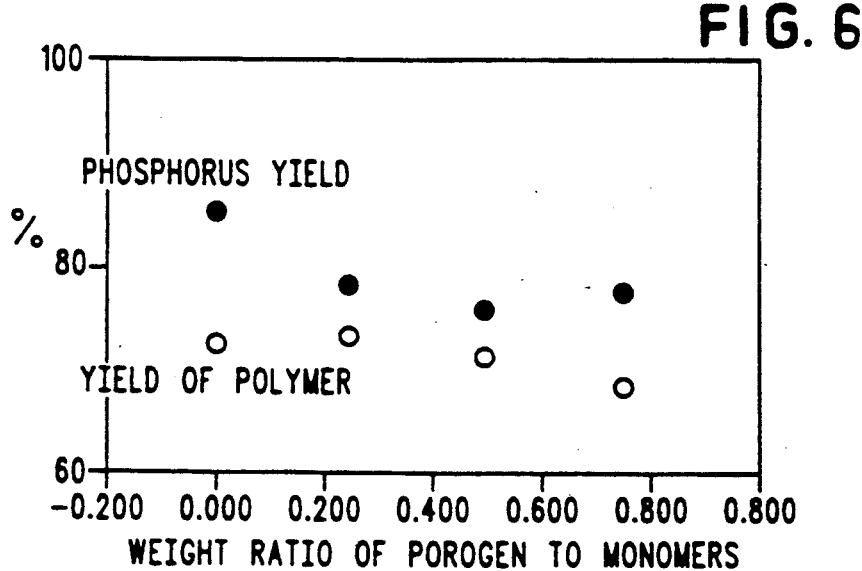
FIG. 6 shows the effect of weight fraction of porogen to monomers on percent $Et_4VDPA$ incorporation and percent yield of polymer.

Specimens were processed in the manner of Example 9, but the amount of porogen was changed (12.5% DVB. Bulk polymy'n, 18 h/70° C. Porogen=2-ethylhexanol (EH).) The data is shown in FIG. 6.

|  | A | B | C | D |
|---|---|---|---|---|
| Resin | 150B | 150E | 150F | 150G |
| Et4VDPA | 0.45 g | 0.45 g | 0.45 | 0.45 |
| butylacrylate | 0.285 g | 0.285 | 0.285 | 0.285 |
| DVB(tech.) | 0.225 g | 0.225 | 0.225 | 0.225 |
| BPO | 0.04 g | 0.04 | 0.04 | 0.04 |
| EH | 0 | 0.25 | 0.50 | 0.75 |
| (% EH) | 0 | 25% | 50% | 75% based on monomer weight |
| % yield | 72.8 | 73.5 | 71.7 | 68.7 |
| % incorporn | 85.3 | 78.6 | 76.76 | 78.0 |

EXAMPLE 16

Figure 7:
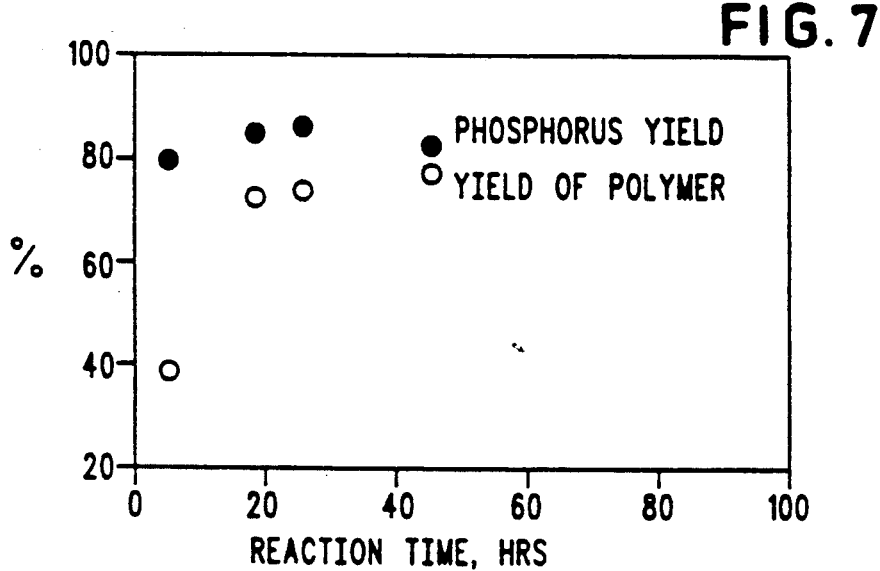
FIG. 7 illustrates the effect of reaction time on percent $Et_4VDPA$ incorporation and percent yield of polymer.

Specimens were processed in accordance with Example 9, but the reaction time was changed. It was determined to be a minor variable as long as the time is greater than approximately 18 hours. (Reaction temp=70° C.; bulk polym'n). The data is shown in FIG. 7.

|  | A | B | C | D |
|---|---|---|---|---|
| Resin | 150A | 150B | 150C | 150D |
| Et4VDPA | 0.45 g | 0.45 g | 0.45 | 0.45 |
| butylacrylate | 0.285 g | 0.285 | 0.285 | 0.285 |
| DVB(tech.) | 0.225 g | 0.225 | 0.225 | 0.225 |
| BPO | 0.04 g | 0.04 | 0.04 | 0.04 |
| Rec time | 5 h | 18 h | 26 h | 46 h |
| % yield | 38.7 | 72.8 | 73.9 | 77.4 |
| % incorporn | 80.1 | 85.3 | 86.6 | 81.9 |

EXAMPLE 17

Figure 8:
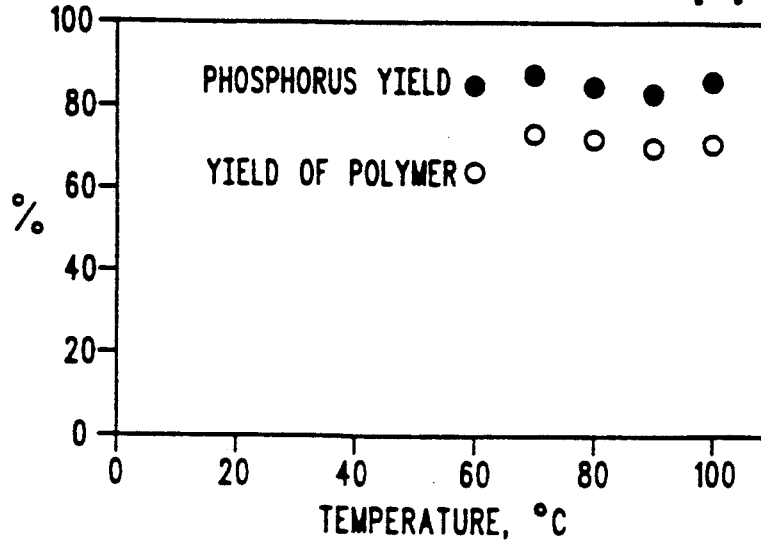
FIG. 8 shows the effect of reaction temperature on percent $Et_4VDPA$ incorporation and percent yield of polymer.

Specimens were processed in accordance with Example 9, but the reaction temperature was changed. The DVB is 12.5%, 18 h reaction time by bulk polymerization. The data is shown in FIG. 8.

|  | A | B | C | D |
|---|---|---|---|---|
| Resin | 143A | 143A | 142A | 142B |
| temp | 60° | 70° | 80° | 90° |
| Et4VDPA | 0.45 g | 0.45 g | 0.45 | 0.45 |
| butylacrylate | 0.28 g | 0.28 | 0.28 | 0.28 |
| DVB(tech.) | 0.225 g | 0.225 | 0.225 | 0.225 |
| BPO | 0.04 g | 0.04 | 0.04 | 0.04 |
| gel point | >5 h | 3 h | 1 h | ½ h |
| % yield | 64.4 | 73.6 | 72.2 | 69.8 |
| % incorporn | 85.6 | 88.1 | 84.3 | 82.6 |

What is claimed is:

1. A polymeric ion exchange resin for extracting metal ions from a liquid waste stream, including:
   (a) a first polymerizable component selected from the group consisting of vinylidene diphosphonic acid and alkyl/aryl esters of said diphosponic acid;
   (b) a second polymerizable component selected from the group consisting of an acrylamide and a styrene;
   (c) a third polymerizable component of a monomer selected from the group consisting of acrylonitrile, methyl acrylate and methyl methacrylate; and
   (d) a fourth polymerizable component of a copolymer selected from the group consisting of a divinylic and a trivinylic cross linking agent.

2. The ion exchange resin as defined in claim 1 wherein said second component comprises a styrene.

3. The ion exchange resin as defined in claim 1 wherein said fourth component comprises a divinylbenzene.

4. The ion exchange resin as defined in claim 1 wherein said polymer is sulfonated.

5. A polymeric ion exchange resin for extracting metal ions from a liquid waste stream, comprising a copolymer prepared by copolymerizing components including:
   (a) a first polymerizable component selected from the group consisting of vinylidene diphosphonic acid and alkyl/aryl esters thereof of from about 5-95 weight percent;
   (b) a second polymerizable component consisting essentially of styrene from about 1-95 weight percent;

(c) a third polymerizable component selected from the group consisting essentially of acrylonitrile of about 10-95 weight percent; and (d) a fourth polymerizable component selected from the group consisting of divinylbenzene of about 5-50 weight percent and 2-ethylhexanol.

6. The ion exchange resin as defined in claim 5 wherein the components are polymerized by reactants selected from the group consisting of ionic and free-radical initiators.

7. The ion exchange resin as defined in claim 5 wherein said polymer is sulfonated.

8. The ion exchange resin as defined in claim 5 wherein said resin has a phosphorous capacity of about 1-5 mequiv/g. per dry resin.

9. The ion exchange resin for extracting metal ions from a liquid waste stream, comprising a copolymer having copolymerized components including:

(a) a first polymerizable component selected from the group consisting of vinylidene diphosphonic acid and alkyl/aryl esters of said diphosphonic acid;

(b) a second polymerizable component of an acrylamide; and (c) a third polymerizable component consisting essentially of acrylonitrile.

10. The ion exchange resin as defined in claim 9 wherein said resin is sulfonated.

11. The ion exchange resin as defined in claim 9 wherein said acrylamide comprises a mixture of N,N'-methylenebisacrylamide and acrylamide.

12. The ion exchange resin as defined in claim 9 further including a fourth polymerizable component as a cross linking agent, said cross linking agent selected from the group consisting of divinylbenzene, trivinylbenzene, and diethylene glycoldiacrylate.

13. The ion exchange resin as defined in claim 12 wherein said cross linking agent consists essentially of divinylbenzene.

14. The ion exchange resin as defined in claim 9 wherein the components are polymerized by reactants selected from the group consisting of ionic and free-radical initiators, said components polymerized in the presence of a porogen.

15. The ion exchange resin as defined in claim 9 wherein said first component ranges from about 5-95 weight percent, said second component ranges from about 1-95 weight percent, said third component ranges from about 10-95 weight percent and said fourth component ranges from about 5-50 weight percent.

* * * * *

UNITED STATES PATENT AND TRADEMARK OFFICE
CERTIFICATE OF CORRECTION

PATENT NO. : 5,281,631
DATED : January 25, 1994
INVENTOR(S) : Horwitz et al.

It is certified that error appears in the above-indentified patent and that said Letters Patent is hereby corrected as shown below:

Col. 4, line 7
    Delete "approPriate" and insert therefor --appropriate--.

Col. 4, line 44
    Delete "adsorbed" and insert therefor --sorbed--.

Col. 6, line 29
    Delete "PH" and insert therefor --pH--.

Figure 5:
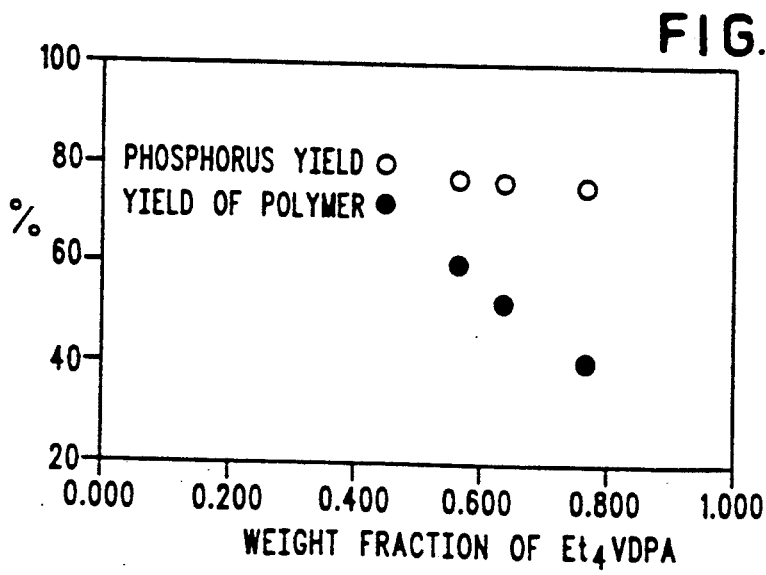
FIG. 5 illustrates the effect of weight fraction of $Et_4VDPA$ on percentage $Et_4VDPA$ incorporation and percent polymer yield.

Col. 11, line 35
    After "data" insert --is shown in FIG. 5--.

Signed and Sealed this

Eighteenth Day of October, 1994

Attest:

BRUCE LEHMAN

Attesting Officer        Commissioner of Patents and Trademarks